United States Patent [19]

Yoshihara et al.

[11] Patent Number: 5,754,880

[45] Date of Patent: May 19, 1998

[54] METHOD FOR COMPONENT MOUNTING BASED ON NUMERICAL CONTROL DATA GENERATING FROM COMPONENT INFORMATION CORRESPONDING TO SUPPLY NUMBERS ASSOCIATED WITH FACTORY NUMBERS LISTED IN CAD DATA

[75] Inventors: Hideki Yoshihara, Hirakata; Tatsuya Kawamura, Takatsuki; Satoshi Masuda, Hirakata; Kenichi Sato, Ikoma, all of Japan

[73] Assignee: Matsushita Electric Industrial Co., Ltd., Osaka-fu, Japan

[21] Appl. No.: 501,989

[22] Filed: Jul. 13, 1995

[30] Foreign Application Priority Data

Jul. 14, 1994 [JP] Japan .................................. 6-161620

[51] Int. Cl.$^6$ .................................................. G06F 17/30
[52] U.S. Cl. ...................... 395/821; 395/82; 364/167.01; 364/191; 364/489; 364/488
[58] Field of Search .......................... 364/191, 167, 364/474, 474.26, 167.01, 489, 488; 29/840; 395/821, 82

[56] References Cited

U.S. PATENT DOCUMENTS

| | | | |
|---|---|---|---|
| 4,490,781 | 12/1984 | Kishi et al. | 364/191 |
| 4,506,331 | 3/1985 | Kishi et al. | 364/474 |
| 4,591,968 | 5/1986 | Nozawa et al. | 364/167 |
| 4,706,187 | 11/1987 | Arai et al. | 364/191 |
| 5,177,689 | 1/1993 | Kinasi et al. | 364/474.26 |
| 5,564,183 | 10/1996 | Satou et al. | 29/840 |

FOREIGN PATENT DOCUMENTS 5-35850  6/1993  Japan ................. G06F 15/62

Primary Examiner—Thomas C. Lee
Assistant Examiner—David Ton
Attorney, Agent, or Firm—Wenderoth, Lind & Ponack L.L.P.

[57] ABSTRACT

A method for mounting electronic components on circuit boards by operating an electronic component-mounting apparatus based on numerical control (NC) data involves the storage of component information, including supply numbers of components purchased from a plurality of makers, maker names of the purchased components, sizes thereof, configurations thereof, and mounting conditions, into a component mounting data base. A correspondence is established between factory numbers listed in a CAD data table and the supply numbers, thereby allowing the management of the supply numbers by grouping one or more supply numbers with each factory number. The supply numbers corresponding to a factory number are used as an index to obtain component information corresponding to each of the supply numbers. This obtained component information is used to generate the numerical control (NC) data for the component-mounting apparatus.

4 Claims, 13 Drawing Sheets

Fig.2

EXAMPLES OF TABLE OF CAD DATA

| FACTORY NUMBER | POSITION COORDINATE | | ANGLE | ~ |
|---|---|---|---|---|
| | X | Y | | |
| AAA | 15000 | 17500 | 0 | |
| AAB | 18000 | 12500 | 0 | |
| AAC | 56000 | 45500 | 90 | |
| AAC | 56000 | 55500 | 180 | |
| ABC | 120000 | 20000 | 90 | |
| ABC | 60000 | 25000 | 270 | |

Fig.3

TABLE OF CORRESPONDENCE (COMPONENT-MOUNTING DATA BASE)

| FACTORY NUMBER | SUPPLY NUMBER | MAKER NAME | MAKER CODE |
|---|---|---|---|
| AAA | BBB | A | 101 |
| AAA | CCC | B | 201 |
| AAA | DDD | C | 301 |
| AAB | AAB | A | 101 |
| AAC | AAC | B | 201 |
| AAC | BBD | D | 401 |
| AAC | CCE | E | 501 |
| ABC | ABC | A | 101 |
| ABC | ABC | C | 301 |
|  |  |  |  |
|  |  |  |  |

GROUP: rows 1–3 (AAA)
GROUP: rows 5–7 (AAC)
GROUP: rows 8–9 (ABC)

*Fig.4*

COMPONENT TABLE
(COMPONENT-MOUNTING DATA BASE)

| SUPPLY NUMBER | MAKER NAME | MAKER CODE | CONFIGURATION CODE | SUPPLY CODE |
|---|---|---|---|---|
| BBB | A | 101 | 1608C1 | TAPE0 |
| CCC | B | 201 | 1608C2 | TAPE0 |
| DDD | C | 301 | 1608C3 | TAPE0 |
| AAB | A | 101 | SMIN15 | TAPE0 |
| AAC | B | 201 | TRL3 | TAPE90 |
| BBD | D | 401 | TRL3A | TAPE270 |
| CCE | E | 501 | TRL3B | TAPE90 |
| ABC | A | 101 | QFP80 | TRAY90 |
| ABC | C | 301 | QFP80C | TRAY270 |
|  |  |  |  |  |
|  |  |  |  |  |

CORRESPONDING TO FACTORY NUMBER AAA

Fig.5

ARRAY DATA TABLE (NC DATA)

| CASSETTE NUMBER | SUPPLY NUMBER | MAKER CODE | CONFIGU-RATION CODE | SUPPLY NUMBER | MAKER CODE | CONFIGU-RATION CODE | SUPPLY NUMBER |
|---|---|---|---|---|---|---|---|
| 1 | BBB | 101 | 1608C1 | CCC | 201 | 1608C2 | DDD |
| 2 | AAB | 101 | SMIN15 | — | — | — | — |
| 3 | AAC | 201 | TRL3 | BBD | 401 | TRL3A | CCE |
| 4 | ABC | 101 | QFP80 | ABC | 301 | QFP80C | — |
| 5 | — | — | — | — | — | — | — |
| 6 | — | — | — | — | — | — | — |

{ SUPPLY NUMBER 1 } { SUPPLY NUMBER 2 } { SUPPLY NUMBER 3 }

CORRESPONDING TO FACTORY NUMBER AAA

Fig.6

COMPONENT LIBRARY TABLE(NC DATA)

| CONFIGU-RATION CODE | SIZE OF COMPONENT (LENGTH×WIDH) | HEIGHT OF COMPONENT | SUPPLY DIRECTION |
|---|---|---|---|
| 1608C1 | 1.60×0.80 | 1.00 | 0 |
| 1608C2 | 1.60×0.80 | 1.10 | 0 |
| 1608C3 | 1.60×0.80 | 1.05 | 0 |
| SMIN15 | 5.00×8.50 | 2.00 | 90 |
| TRL3 | 5.50×4.50 | 2.50 | 90 |
| TRL3A | 5.50×4.50 | 2.55 | 270 |
| TRL3B | 5.50×4.50 | 2.45 | 90 |
| QFP80 | 10.0×10.0 | 2.00 | 90 |
| QFP80C | 10.0×10.0 | 2.10 | 270 |

Fig. 12  PRIOR ART

COMPONENT TABLE
(COMPONENT-MOUNTING DATA BASE)

| FACTORY NUMBER | CONFIGU-RATION CODE | SUPPLY CODE | ~ |
|---|---|---|---|
| AAA | 1608C1 | TAPE0 | ~ |
| AAB | SMIN15 | TAPE0 | ~ |
| AAC | TRL3 | TAPE90 | ~ |
| ABC | QFP80 | TRAY90 | ~ |
| EFG | 2125C5 | TAPE180 | ~ |

Fig. 13  PRIOR ART

ARRAY DATA LIST(NC DATA)

| CASSETTE NUMBER | FACTORY NUMBER | CONFIGU-RATION CODE | ~ |
|---|---|---|---|
| 1 | AAA | 1608C1 | ~ |
| 2 | AAB | SMIN15 | ~ |
| 3 | AAC | TRL3 | ~ |
| 4 | ABC | QFP80 | ~ |
| 5 | — | — | ~ |

Fig.14 PRIOR ART

COMPONENT NUMBER CORRESPONDING-MEMORANDUM

| FACTORY NUMBER | 1 | | | 2 | | |
|---|---|---|---|---|---|---|
| | SUPPLY NUMBER | MAKER CODE | CONFIGU-RATION CODE | SUPPLY NUMBER | MAKER CODE | CONFIGU-RATION CODE |
| AAA | BBB | 101 | 1608C1 | CCC | 201 | 1608C2 |
| AAB | — | — | — | — | — | — |
| AAC | AAC | 201 | TRL3 | BBD | 401 | TRL3A |
| ABC | ABC | 101 | QFP80 | ABC | 301 | QFP80C |
| ∫ | ∫ | ∫ | ∫ | ∫ | ∫ | ∫ |

METHOD FOR COMPONENT MOUNTING BASED ON NUMERICAL CONTROL DATA GENERATING FROM COMPONENT INFORMATION CORRESPONDING TO SUPPLY NUMBERS ASSOCIATED WITH FACTORY NUMBERS LISTED IN CAD DATA

BACKGROUND OF THE INVENTION

The present invention relates to a component-mounting method for generating numerical control (NC) data on the basis of which an electronic component-mounting apparatus is operated. More particularly, the present invention relates to a method for managing component numbers of components purchased from many manufactures and for selectively controlling data corresponding to each component.

An example of a conventional method for managing a number of components to be mounted on circuit boards is described below with reference to FIG. 11. FIG. 11 shows a flowchart of an operator's work, a management system, and a control part of equipment which includes the electronic component-mounting apparatus. The flow chart relates to a process for generating NC data for driving a conventional electronic component-mounting apparatus. FIG. 11 shows a fundamental process of generating the NC data used to drive the electronic component-mounting apparatus based on CAD data for the type of circuit boards being used and for mounting electronic components on the circuit board based on the NC data. It is noted that a component number listed in the CAD data table is hereinafter referred to as a factory number and the number of a component supplied from a component maker is referred to as a supply number.

At step S21, the operator issues an instruction indicating the generation of the NC data. The managing system retrieves a portion of a block of the CAD data corresponding to a factory number. The system uses this portion as an index to data describing the information of each component-mounting position coordinate of the circuit board from a component table (see FIG. 12) provided in a "mounting information" data base. The NC data is generated at step S22 and includes necessary information corresponding to the portion of data found by the retrieval. The managing method is described below more specifically, using, by way of example, a factory number of AAA. A portion of data having AAA as the factory number is retrieved from the component table. The information of the portion corresponding to the factory number AAA, 1608C1 and TAPE0, is obtained from the component table as a configuration code and a supply code, respectively. Based on the data thus obtained, the "mounting information" data base is accessed to retrieve information corresponding to the data. In this manner, the NC data is generated. FIG. 13 shows array data generated as the NC data. In the array data, the configuration code of 1608C1 is outputted in response to an input of a factory number AAA.

At steps S23 through S25, the generated NC data is loaded into a control portion of the equipment that includes the electronic component-mounting apparatus. Then, production preparatory work for operating the electronic component-mounting apparatus is started. In a component supply section of the equipment, the operator checks the supply number and a maker code on a component supply device located at a supply section of the apparatus, for example, a reel for supplying components at step S26. At step S27, with reference to a component-number-corresponding memorandum (see FIG. 14), the operator compares the configuration code corresponding to the confirmed maker code and supply number with a configuration code listed in the array data. In the example, it is assumed that the supply number corresponding to the factory number AAA of the component supply device is CCC. The configuration code for the supply number CCC is found as 1608C2 in the table of the corresponding-memorandum, while the configuration code corresponding to the factory number AAA in the array data is 1608C1 which is different from that of the former. In this case, the configuration code of cassette number 1 in the array data is altered from 1608C1 to 1608C2 at steps S28 and S29. The regenerated array data is re-loaded on the control part of the equipment at step S30.

After similar operations are performed for all cassette numbers listed in the array data, a predetermined production is started at step S31. At step S32, the production is carried out by the equipment. Each time components are replaced from one group to another at step S33 and the production is continued at S34, the processing at steps S26 through S32 is repeatedly executed to complete the production.

The above-described conventional method for managing the mounting of components on the circuit board has problems because only one number, the factory number, is used by the managing system and the data table. First, there is no correspondence established between the factory number and the supply number in the managing system. Hence, in workshops, it is necessary for an operator to make decisions based on the memorandum. Second, in the equipment, since the operator cannot decide whether or not the supply number read from the component supply device matches the factory number of the NC data, there is a possibility that a wrong cassette including other components can be selected, i.e., the wrong component supply device is set at the supply section of the equipment. Lastly, the data of the sizes of components such as the heights and supply directions thereof are different from each other, depending on makers. Thus, each time circuit boards or components are switched from one kind to another, it is necessary for the operator to change the NC data (array data) of components by checking the supply number of each component supply device and the maker code thereof before production is started.

SUMMARY OF THE INVENTION

An object of the present invention is to provide a component-mounting method which can reduce an operator's data-managing operation, efficiently check whether or not appropriate components have been selected before mounting the components, and efficiently alter data related to the components.

According to one aspect of the present invention, there is provided a method for mounting electronic components on circuit boards by operating an electronic component mounting apparatus based on numerical control (NC) data. First, component information including, supply numbers, names of the makers of the components, and sizes, configurations, and mounting conditions of the components are stored in a component-mounting data base. The information can be stored accordingly to one of the types of information, for example, by the supply numbers. Second, in a table of correspondence, a correspondence is established between factory numbers listed in a CAD data table and the supply numbers. A plurality of supply numbers can be grouped with each factory number. Third, the supply numbers corresponding to a given factory number are obtained from the table of correspondence. Lastly, component information corresponding to each of the supply numbers is obtained from the component-mounting data base and numerical control (NC) data based on the obtained component information is generated.

According to the above method, the factory numbers and the supply numbers are grouped and managed and a correspondence between the factory numbers and the supply numbers is established. Therefore, checking operations of the component numbers between the factory numbers and the supply numbers is automatically accomplished. Thus, unlike the conventional method, the method of the present invention eliminates the need for the operator to compare the supply numbers and the factory numbers with each other. The method of the present invention can perform both the process for generating the NC data and the operator's preparatory work. The operator gets a supply number and a maker name of a component from the component supply section of the component-mounting apparatus. Unlike the conventional method, even though the factory number and the supply number are different from each other, the method according to the present invention can prevent wrong components from being set at the supply section. Moreover, the operation of altering recognition data that is necessary for the conventional equipment can be eliminated.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2 is a view showing an example of a CAD data table according to the present invention;

FIG. 3 is a view showing a table of correspondence to be used in the managing system according to the present invention;

FIG. 4 is a view showing a component table to be used in the managing system according to the present invention;

FIG. 5 is a view showing as a document list an array data table according to the present invention;

FIG. 6 is a view showing a component library table to be used by an electronic component-mounting apparatus according to the present invention;

FIG. 12 is a view showing a component table to be used by the conventional component-mounting method;

FIG. 13 is a view showing an array data table to be used by the conventional component-mounting method; and FIG. 14 is a view showing a table of a component number corresponding-memorandum to be used by the conventional component-mounting method.

DETAILED DESCRIPTION OF THE PREFERRED EMBODIMENTS

Figure 1:
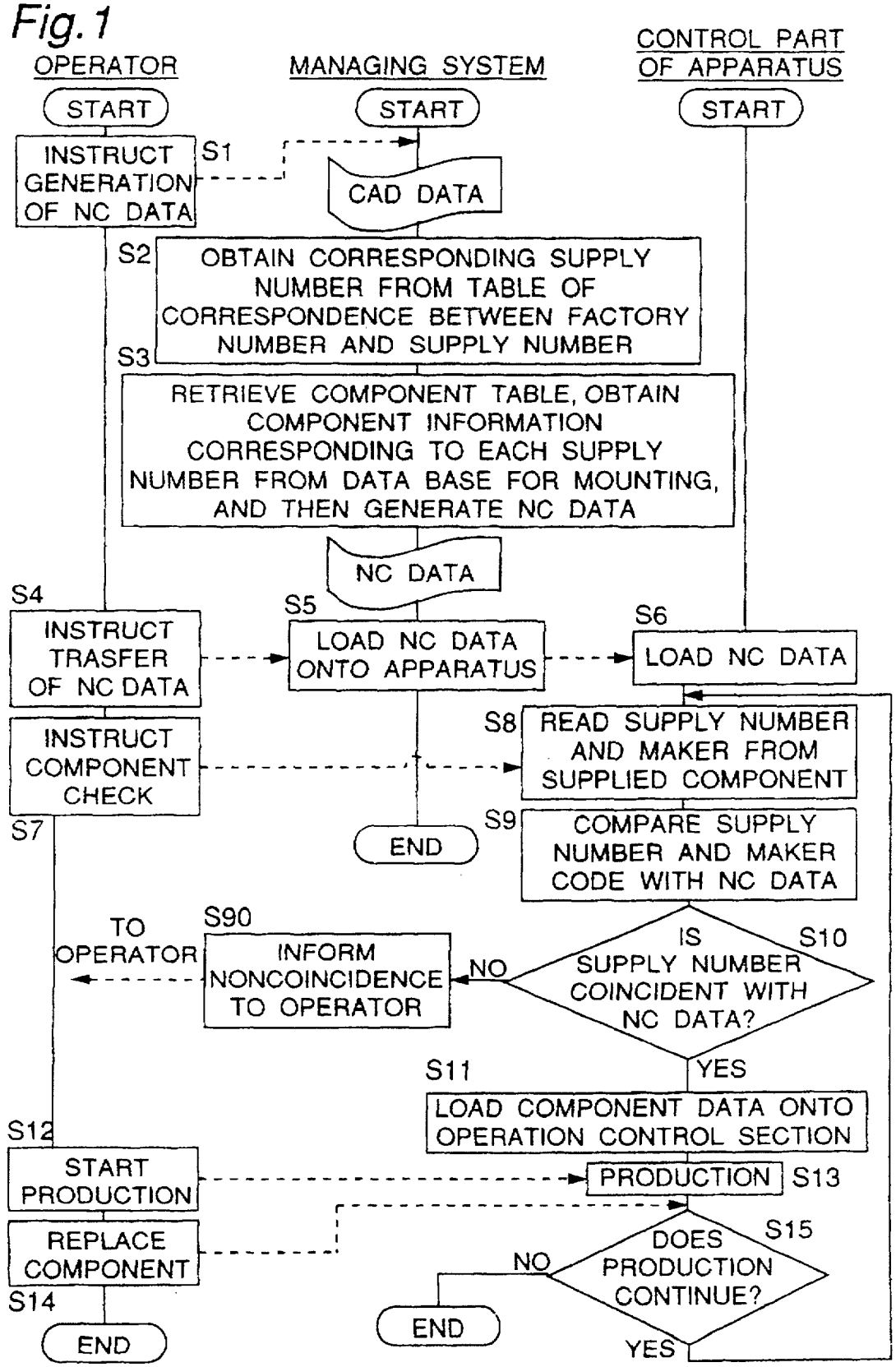
FIG. 1 is a flowchart showing an operator's work, an operation to be executed by a managing system, and an operation to be executed by a control part of a component-mounting apparatus according to the component-mounting method of the present invention.

Before the description of the present invention proceeds, it is to be noted that like parts are designated by like reference numerals throughout the accompanying drawings.

The component-mounting method according to the present invention is described below in detail with reference to FIGS. 1 through 10.

The system of the present invention is used for managing equipment that includes an electronic component-mounting apparatus, etc. The system employs a method for managing component numbers of electronic components associated with a factory number. For example, as shown in FIG. 3, a plurality of components purchased from different manufacturers can be associated with a single factory number AAA. The system generates numerical control (NC) data to be used to drive the electronic component-mounting apparatus. A control part of the apparatus accesses a component library based on the generated NC data using a supply number as an index and retrieves the data of the corresponding component.

FIG. 1 shows a flowchart of an operator's work, the operation to be executed by the managing system, and the operation to be executed by the control part of the apparatus according to the present invention. FIG. 2 shows an example of a CAD data table according to the embodiment. FIG. 3 shows a table of correspondence between factory numbers and supply numbers listed in a component-mounting data base. FIG. 4 shows a component table to be managed, for each supply number in the data base, by the managing system.

A process for generating the NC data to be used to drive the electronic component-mounting apparatus based on the CAD data is described below.

As shown in FIG. 1, at step S1 the operator issues an instruction indicating the generation of the NC data by designating CAD data corresponding to the factory number (AAA). In the CAD data, objective components to be mounted on the circuit board are specified for each factory number as shown in FIG. 2.

The managing system uses a table of correspondence (see FIG. 3) and a component table (see FIG. 4) as a data base for mounting electronic components on the circuit boards. The table of correspondence provides correspondence between factory numbers and a plurality of groups of supply numbers of components. The component table links the information for each component such as the size, configuration, and supply condition to the corresponding component supply number.

A factory number from the CAD data is input into the managing system. At step S2, a supply number or supply numbers corresponding to the factory number are obtained from the table of correspondence. For example, for a factory number AAA, supply numbers BBB, CCC, and DDD are obtained as shown in FIG. 3.

At step S3, the configuration code and supply code for each obtained supply number are retrieved from the component table of FIG. 4. Various information for each component is obtained from the data base using the obtained configuration codes and the supply codes. This information is used to generate the NC data in the form of an array data table and a component library. As shown in FIG. 5, in the array data table, all supply numbers are listed in a block of a cassette number. Supposing that the factory number is AAA, all the corresponding supply numbers BBB, CCC, DDD are listed in the block of cassette number 1.

The equipment for carrying out the component-mounting method is described below, using factory number AAA as an example.

Figure 7:
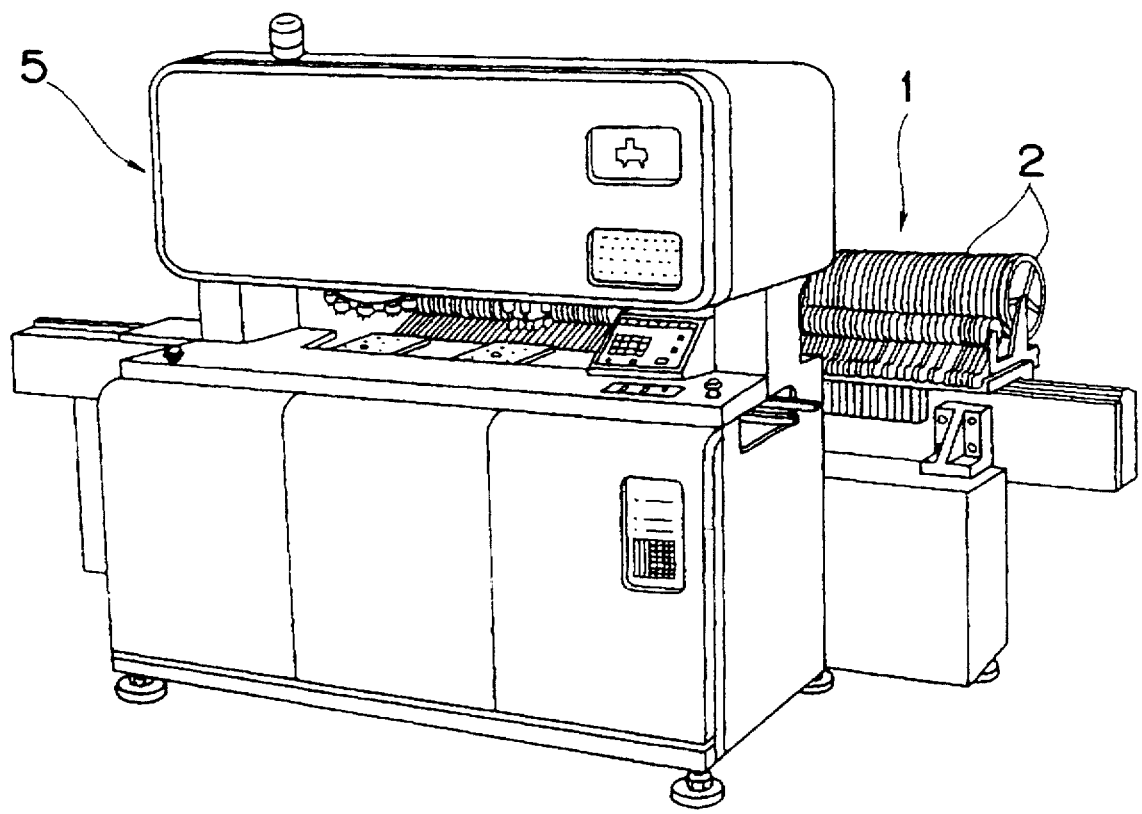
FIG. 7 is a perspective view showing, as a whole, the electronic component-mounting apparatus according to the present invention.
Figure 8:
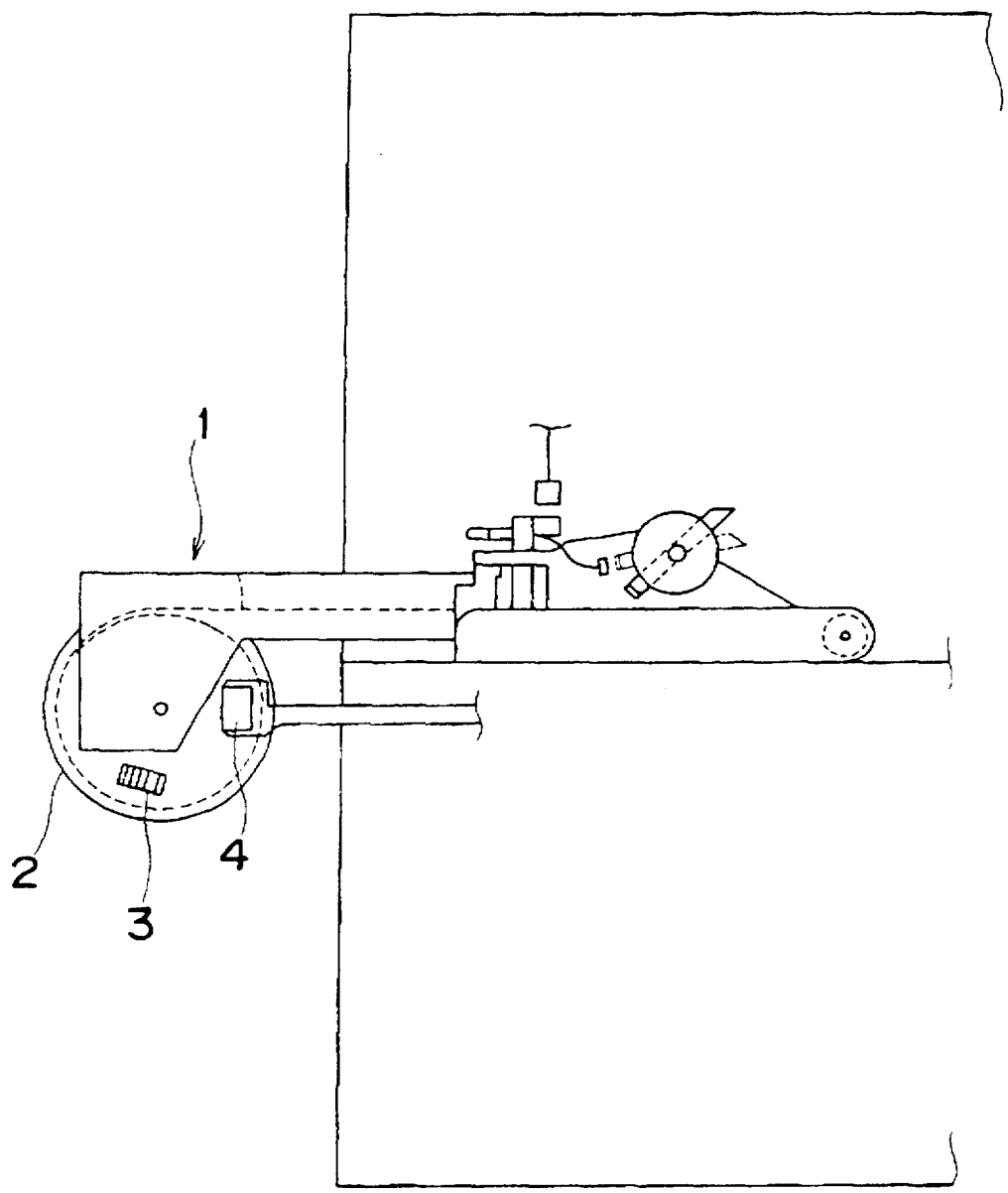
FIG. 8 is a side view showing a schematic construction of a component supply section of the electronic component-mounting apparatus according to the present invention.
Figure 10:
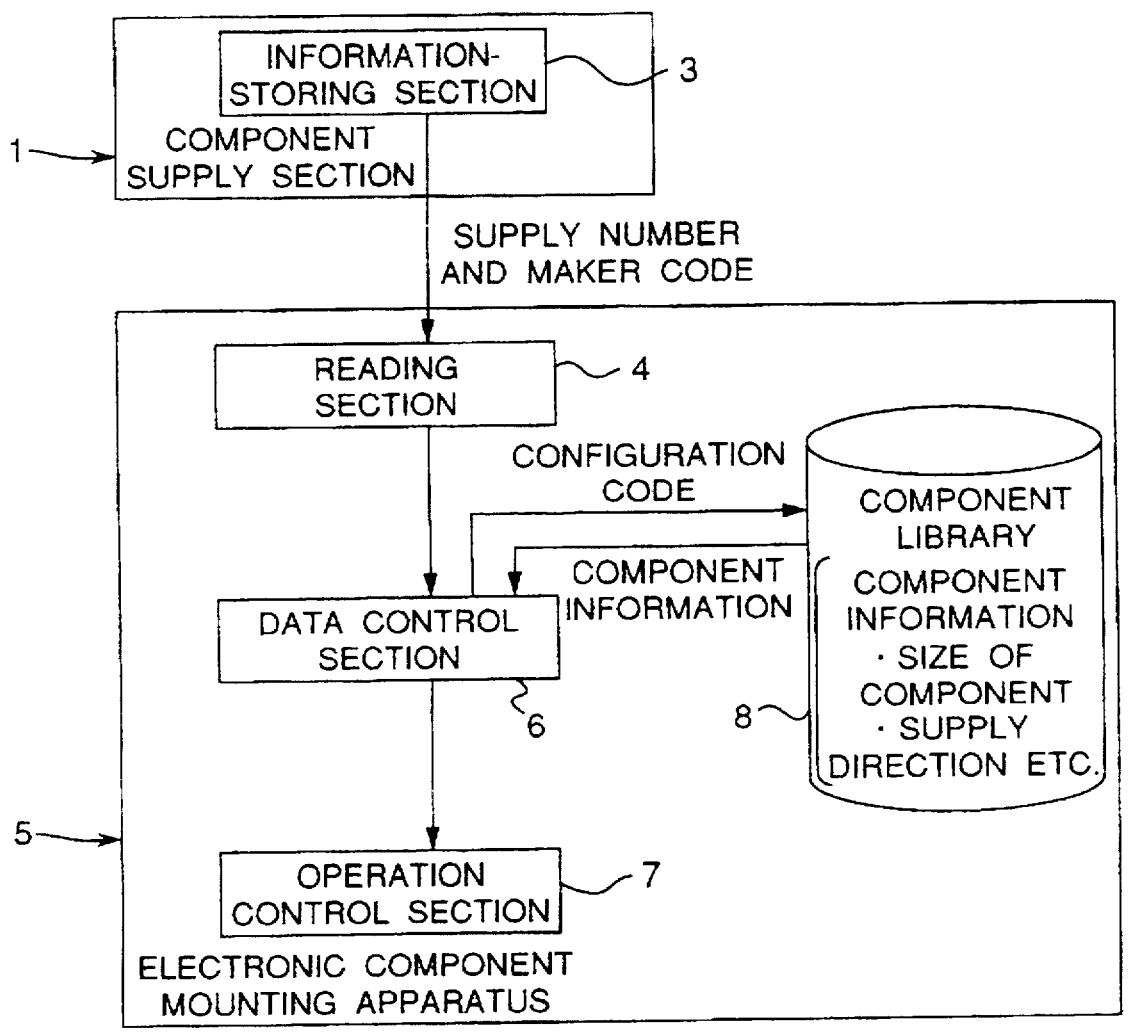
FIG. 10 is a view showing the construction of the component supply section of the electronic component-mounting apparatus and the control part, etc. provided on the body of the electronic component-mounting apparatus according to the present invention.
Figure 11:
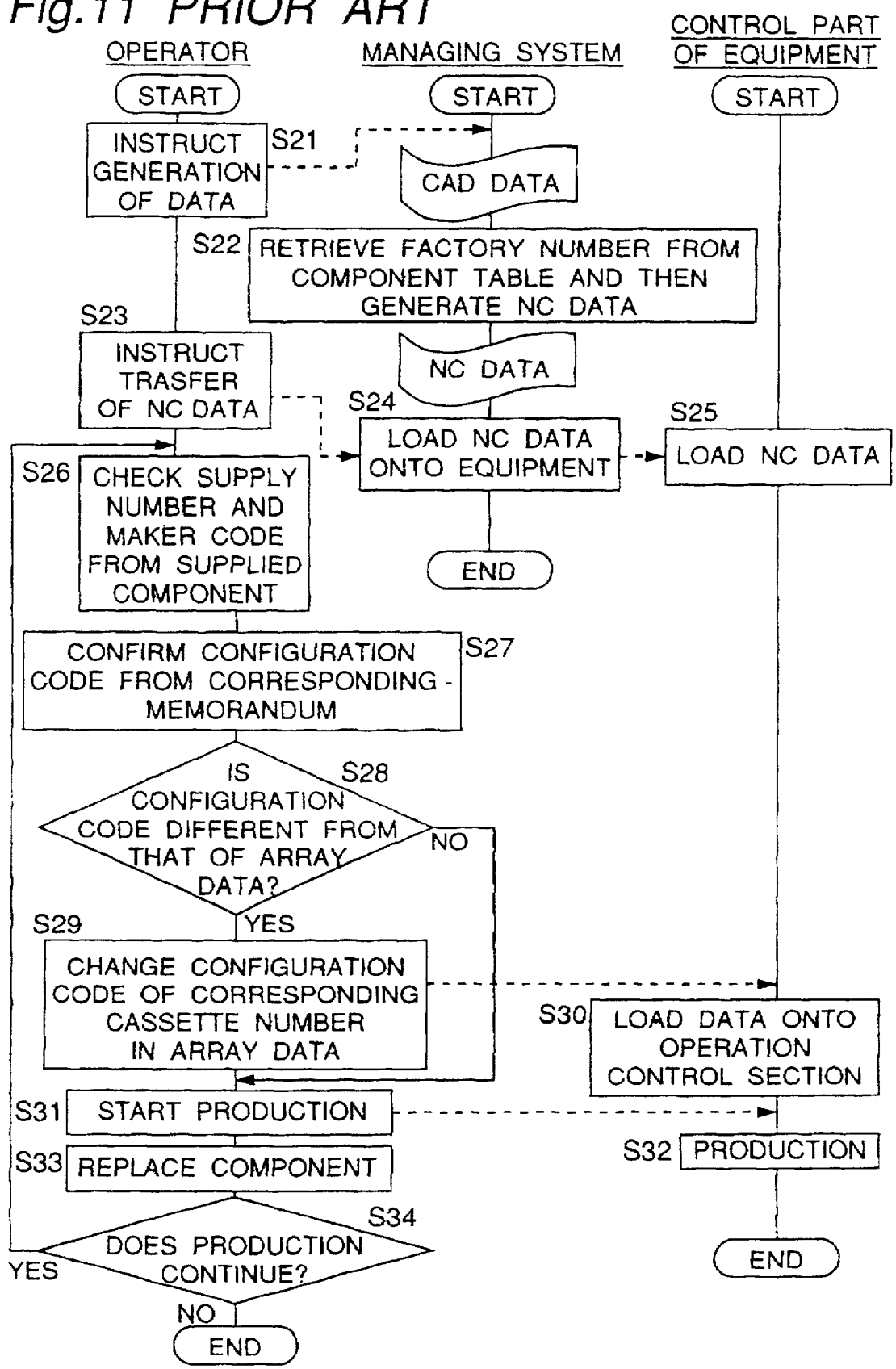
FIG. 11 is a flowchart of an operator's work, a conventional component number-managing method, and a control part of equipment comprising the electronic component-mounting apparatus which relates to a process for generating NC data for driving a conventional electronic component-mounting apparatus.

FIG. 7 is a perspective view showing the electronic component-mounting apparatus 5 according to the present invention. The apparatus includes a component supply section 1, a reel 2 including a tape with components accommodated thereon, and a component-mounting apparatus 5. As shown in FIG. 6, the reel 2 has an information-recording section 3 with component-identifying information such as the supply numbers and the maker codes of the components stored therein. The supply section 1 includes an information-reading section 4. As shown in FIG. 10, the component mounting apparatus 5 includes a data control section 6, an operation control section 7, and a component library 8.

Figure 9:
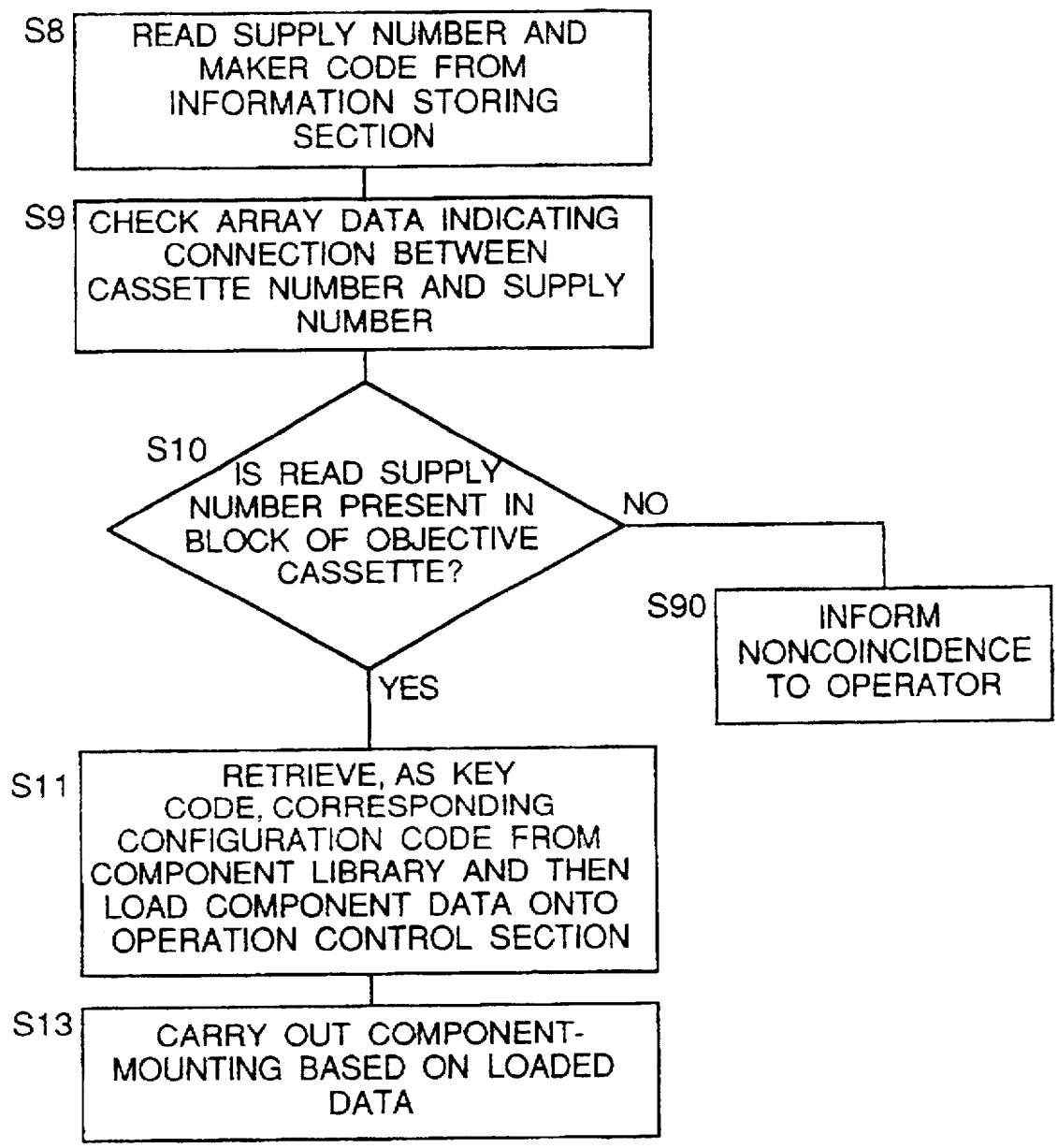
FIG. 9 is a flowchart showing the detail of the processing to be executed by the control part of the electronic component-mounting apparatus according to the present invention.

FIG. 9 is a flowchart showing the details of the processing executed by the control part as shown in FIG. 1.

As shown in FIG. 1 at steps S4 through S6, the NC data generated by the managing system is loaded on the electronic component-mounting apparatus 5 according to an instruction issued by the operator. After components are set on the component supply section 1, the component number indicated on the components is checked by the control part of the apparatus 5 at step S7. Specifically, as shown in FIGS. 9 and 10, the information-reading section 4 reads the supply number and the maker code from the information recording section 3 at step S8. Upon receipt of the information from the information recording section 3 the supply number and the maker code are compared by the data control section 6, at steps S9 and S10, with those listed in the array data (FIG. 5) stored in the data control section 6. At step S10, when the supply number and maker code do not coincide with those of the NC data, the operator is informed of the noncoincidence at step S90 via an operation display of the apparatus. If there is coincidence at step S10, the process progresses to step S11. As an example, assume that the supply number and the maker code read by the information-reading section 4 are CCC and 201, respectively. In the array data table, CCC and 201 are listed in the block of the cassette number 1 as the supply number CCC and the maker code 201, respectively. Therefore, it is proved that the component has been set at the component supply section 1 of the electronic component-mounting apparatus 5 without an error.

At step S11, the configuration code corresponding to the supply number CCC is retrieved by the data control section 6 from the array data and used as an index to access the component library 8 shown in FIG. 6. The component data such as the size, height, and supply direction of the component corresponding to the configuration code of 1608C2 is transferred by the data control section 6 from the component library 8 to the operation control section 7 of the electronic component-mounting apparatus 5. Similar operations are performed for all cassette numbers described in the array data table.

Upon receipt of an instruction indicating the start of production issued by the operator at either step S12, a component-mounting operation is performed by the operation control section 7 at step S13 based on the loaded data. Thereafter, each time components are switched from one kind to another at step S14 and the production is continued at step S15, and the process at step S7 through step S13 is repeatedly executed for required cassette numbers so as to carry out production. The decision at step S15 is made by the data control section 6 and an instruction is inputted by an operator. Instructions inputted by the operator at steps S7, S12, S14, etc. are inputted into the data control section 6.

According to the conventional component-mounting method, the operator at the component supply section manually checks whether or not the supply number matches the factory number by looking at the corresponding-memorandum. The component-mounting method according to the present invention allows automation of the above operation and thus reduces the operator's work. The present invention also prevents the wrong components from being set at the component supply section, thereby providing an improved operation rate.

As described above, according to the present invention, components purchased from many makers can be easily managed by establishing correspondence between factory numbers and supply numbers, grouping the factory numbers and the supply numbers, and storing such data of the correspondence and grouping into the mounting data base. Additionally, the NC data is formed so that all of the supply numbers and maker codes can be described with respect to the objective cassette numbers. The control part of the component-mounting apparatus can compare the supply number read from components at the component supply section with the corresponding component number of the NC data and then automatically select the component data.

Although the present invention has been fully described in connection with the preferred embodiment thereof with reference to the accompanying drawings, it is noted that various changes and modifications will be apparent to those skilled in the art. Such changes and modifications are to be understood as included within the scope of the present invention as defined by the appended claims unless they depart therefrom.

What is claimed is:

1. A method for mounting electronic components on circuit boards by operating an electronic component-mounting apparatus based on numerical data data, comprising:

storing component information indexed by supply numbers, in a component-mounting data base wherein the component information comprises maker names, sizes, configurations, and mounting conditions of the purchased components;

establishing correspondence between factory numbers listed in a CAD data table and the supply numbers;

obtaining the supply numbers corresponding to at least one of the factory numbers listed in the CAD data table;

obtaining component information corresponding to each obtained supply number from the component-mounting data bases; and generating the numerical control data based on the obtained component information.

2. The method as claimed in claim 1, wherein the supply numbers corresponding to each factory number listed in the CAD data table and the component information for each of the supply numbers are included as part of the numerical control data.

3. The method as claimed in claim 2, further comprising:

reading, by a reading device provided on the electronic component-mounting apparatus, component identifying information from a component supplying device, wherein the component identifying information comprises a maker name and a supply number;

comparing the information obtained by the reading with the numerical control data to decide whether or not the numerical control data includes the supply number of the component identifying information read by the reading means; and selecting component information corresponding to the supply number of the numerical control data when the numerical control data includes the supply number of the component identifying information read by the reading means; and operating the electronic component-mounting apparatus based on the selected component information.

4. The method as claimed in claim 1, wherein in establishing correspondence between factory numbers listed in a CAD data table and the supply numbers, correspondence is established between a plurality of supply numbers and a factory number listed in the CAD data table.

* * * * *